US009464758B2

(12) United States Patent
Kojima et al.

(10) Patent No.: US 9,464,758 B2
(45) Date of Patent: Oct. 11, 2016

(54) PRESSURE VESSEL AND PRODUCTION METHOD THEREOF

(71) Applicant: TOYOTA JIDOSHA KABUSHIKI KAISHA, Toyota-shi, Aichi-ken (JP)

(72) Inventors: Makoto Kojima, Toyota (JP); Kentaro Hioki, Toyota (JP); Shusuke Inagi, Okazaki (JP); Ryosuke Okumura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/433,377

(22) PCT Filed: Sep. 26, 2013

(86) PCT No.: PCT/JP2013/005721
§ 371 (c)(1),
(2) Date: Apr. 2, 2015

(87) PCT Pub. No.: WO2014/054251
PCT Pub. Date: Apr. 10, 2014

(65) Prior Publication Data
US 2015/0204483 A1 Jul. 23, 2015

(30) Foreign Application Priority Data
Oct. 5, 2012 (JP) ................................. 2012-223071

(51) Int. Cl.
*F17C 1/12* (2006.01)
*F17C 1/06* (2006.01)
(Continued)

(52) U.S. Cl.
CPC ............. *F17C 1/12* (2013.01); *B29C 44/1271* (2013.01); *F16C 1/16* (2013.01); *F17C 1/06* (2013.01);
(Continued)

(58) Field of Classification Search
CPC .............. F17C 1/12; F17C 1/06; F17C 1/16; F17C 13/001; B29C 44/1271
USPC ......... 220/589, 588, 586, 581, 62.22, 62.19, 220/62.15, 62.11, 592.25, 592.2, 560.15, 220/560.12, 560.04
See application file for complete search history.

(56) References Cited

U.S. PATENT DOCUMENTS 3,317,074 A * 5/1967 Long ........................ F17C 3/06
138/149
3,883,625 A * 5/1975 Thomas .................. B32B 27/00
264/321

(Continued)

FOREIGN PATENT DOCUMENTS

JP H 03-113199 A 5/1991
JP H 04-071628 U 6/1992

(Continued)

*Primary Examiner* — Robert J Hicks
(74) *Attorney, Agent, or Firm* — Finnegan, Henderson, Farabow, Garrett & Dunner, LLP

(57) ABSTRACT

A second protective member (62) is provided to cover a thin wall portion and its periphery of a second tank head section (92), so as to protect the thin wall portion. The thin wall portion is a region of the second tank head section (92) in which a reinforcing layer (20) has a smaller wall thickness. The second protective member (62) has a double layer structure including an inner layer made of polyurethane and an outer layer made of a material mixture of polyurethane and expanded graphite. This structure suppresses the mass and the volume of a pressure vessel from being increased by the presence of a protective layer.

7 Claims, 2 Drawing Sheets

(51) Int. Cl.
   *F17C 1/16*     (2006.01)
   *B29C 44/12*    (2006.01)
   *F16C 1/16*     (2006.01)
   *B29K 75/00*    (2006.01)
   *B29K 105/04*   (2006.01)
   *B29L 31/00*    (2006.01)

(52) U.S. Cl.
   CPC ........ *B29K 2075/00* (2013.01); *B29K 2105/04* (2013.01); *B29L 2031/7156* (2013.01); *F17C 2201/0109* (2013.01); *F17C 2201/056* (2013.01); *F17C 2203/0329* (2013.01); *F17C 2203/0604* (2013.01); *F17C 2203/066* (2013.01); *F17C 2203/0619* (2013.01); *F17C 2203/0621* (2013.01); *F17C 2203/0663* (2013.01); *F17C 2205/0196* (2013.01); *F17C 2205/0397* (2013.01); *F17C 2209/2109* (2013.01); *F17C 2209/227* (2013.01); *F17C 2221/012* (2013.01); *F17C 2223/0123* (2013.01); *F17C 2223/036* (2013.01); *F17C 2260/012* (2013.01); *F17C 2270/0168* (2013.01); *Y02E 60/321* (2013.01)

(56) References Cited

U.S. PATENT DOCUMENTS

| | | | |
|---|---|---|---|
| 4,122,203 A * | 10/1978 | Stahl | B32B 5/18 |
| | | | 156/71 |
| 5,004,120 A | 4/1991 | Hembert | |
| 5,476,189 A | 12/1995 | Duvall et al. | |
| 7,255,245 B2 * | 8/2007 | Oliveira | F17C 1/04 |
| | | | 220/586 |
| 8,038,029 B2 | 10/2011 | Lindner et al. | |
| 2002/0088806 A1 | 7/2002 | Takaku et al. | |
| 2009/0255940 A1 | 10/2009 | Murate et al. | |
| 2009/0308874 A1 * | 12/2009 | Lindner | B29C 70/32 |
| | | | 220/560.05 |
| 2011/0180551 A1 | 7/2011 | Handa | |
| 2011/0303662 A1 | 12/2011 | Handa | |

FOREIGN PATENT DOCUMENTS

| | | |
|---|---|---|
| JP | H 08-035598 A | 2/1996 |
| JP | 3025569 U | 4/1996 |
| JP | 2001-21099 | 1/2001 |
| JP | 2004-176798 | 6/2004 |
| JP | 2007-333175 | 12/2007 |
| JP | 2011-149545 | 8/2011 |
| JP | 2011-194952 A | 10/2011 |
| JP | 2012-002257 A | 1/2012 |

* cited by examiner

PRESSURE VESSEL AND PRODUCTION METHOD THEREOF

CROSS REFERENCE TO RELATED PATENT APPLICATIONS

This application is a national phase of International Application No. PCT/JP2013/005721, filed on Sep. 26, 2013, which is incorporated herein in its entirety by reference.

FIELD

The present invention relates to a pressure vessel.

BACKGROUND ART

A pressure vessel storing hydrogen or the like includes, for example, a liner, a reinforcing layer and a protective layer. The inside of the liner defines a storage chamber. The reinforcing layer is made of a fiber-reinforced plastic formed on an outer surface of the liner. The protective layer is formed on an outer surface of the reinforcing layer such that a thermally foamable resin layer is placed between glass fibers (for example, Patent Literature 1).

CITATION LIST

Patent Literature

[Patent Literature 1] JP 2012-2257A

SUMMARY

Technical Problem

A problem of the above prior art technique is that the mass and the volume of the pressure vessel are increased by the presence of the protective layer. Other needs over the prior art technique include downsizing of the pressure vessel, cost reduction, resource saving, simplification of manufacture and improvement of usability.

Solution to Problem

In order to solve the problems described above, the invention may be implemented by any of the following aspects.

(1) According to one aspect, there is provided a pressure vessel, comprising: a vessel main body having a tank head section and a shell plate section; and a protective member including a non-foamed thermally foamable material, which forms a heat insulating layer when being foamed, and placed to cover part of an outer surface of the tank head section. When the tank head section includes a region of the vessel main body having a smallest wall thickness, this aspect enables the region to be protected from high temperature by foaming the thermally foamable material. The protective member is arranged not to cover the shell plate section. This arrangement avoids adverse effect caused by extending the region covered by the protective member. The adverse effect includes, for example, increasing the outer diameter of the pressure vessel, increasing the mass of the pressure vessel and decreasing the heat release performance of the pressure vessel.

(2) In the above aspect, the protective member may include a layer containing the thermally foamable material and a layer containing a buffer material. This aspect enables the protective member to be produced at low cost, while providing the function of protection from impact to the protective member. In order to provide the function of protection from impact, it is preferable that the protective member has a certain level of volume. Including the thermally foamable material in the entire volume is likely to increase the cost of the protective member. Forming the protective member to include the layer containing the thermally foamable material and the layer containing the buffer material reduces the amount of the thermally foamable material used, while enabling the protective member to have a certain level of mass. This results in achieving the above advantageous effect.

(3) In the above aspect, the layer containing the buffer material may be placed on inner side of the layer containing the thermally foamable material. Even when the layer containing the buffer material has relatively low resistance to high temperature, this aspect enables the layer containing the buffer material to be protected from high temperature by the layer containing the thermally foamable material.

(4) In the above aspect, the tank head section protected by the protective member may be a tank head section without a safety valve provided to work at high temperature. This aspect decreases the possibility of interfering with the normal operation of the safety valve. This is because placing the protective member in the neighborhood of the safety valve is likely to interfere with release of the pressure by foaming of the thermally foamable material.

(5) In the above aspect, the protective member may have an outer diameter that is equal to or smaller than outer diameter of the vessel main body. This aspect prevents an increase in outer diameter of the pressure vessel.

(6) In the above aspect, the part of the tank head section covered by the protective member may include a region having a smallest wall thickness. This aspect protects the region having the smallest wall thickness, i.e., the region having the lowest resistance to high temperature.

(7) According to another aspect, there is provided a production method of a pressure vessel, comprising: producing a vessel main body including a tank head section and a shell plate section; and covering a protective member including a non-foamed thermally foamable material, which forms a heat insulating layer when being foamed, over at least part of an outer surface of the tank head section to be fixed to the at least part of the outer surface of the tank head section.

The invention may be implemented by any of various aspects other than those described above. For example, the invention may be applied to the above protective member or a production method of this protective member as described below.

(A) According to another aspect, there is provided a protective member arranged to cover at least part of an outer surface of a vehicle main body including a tank head section and a shell plate section and thereby protect the vehicle main body, the protective member being configured to include a non-foamed thermally foamable material, which forms a heat insulating layer when being foamed, and placed to cover at least part of the outer surface of the tank head section.

(B) The protective member of the above aspect may include a layer containing the thermally foamable material and a layer containing a buffer material.

(C) In the protective member of the above aspect, the layer containing the buffer material may be placed on inner side of the layer containing the thermally foamable material.

(D) The tank head section protected by the protective member of the above aspect may be a tank head section without a safety valve provided to work at high temperature.

(E) The protective member of the above aspect may have an outer diameter that is equal to or smaller than outer diameter of the vessel main body.

(F) According to another aspect, there is provided a production method of a protective member arranged to cover at least part of an outer surface of a vehicle main body and thereby protect the vehicle main body, the production method comprising: a first step of forming a first layer constituting the protective member by mold forming; and a second step of forming a second layer constituting the protective member and being stacked on the first layer by mold forming, wherein at least one of the first layer and the second layer includes a thermally foamable material. This aspect enables the protective member of double layer structure to be readily produced.

(G) In the production method of the above aspect, the thermally foamable material may be included in only a layer placed on outer side in an application of protecting a pressure vessel out of the first and the second layers. This aspect reduces the material cost of the thermally foamable material. It is preferable that the thermally foamable material is included in the layer placed on the outer side as described above.

(H) In the production method of the above aspect, the second layer may include the thermally foamable material. This aspect enables the first layer and the second layer to be readily bonded to each other. This advantageous effect is achieved by first forming the first layer which does not include the thermally foamable material and is placed on the inner side and subsequently forming the second layer which includes the thermally foamable material and is placed on the outer side as described in (F), (G) and (H).

It is preferable that the first layer and the second layer are bonded to each other. The type of bonding may be, for example, mechanical linkage. An exemplary technique of mechanical linkage is a "dovetail joint". The dovetail joint is a type of joint and is the technique using a "tenon" having the cross sectional shape of narrowed base like a head of an ant. The tenon is a protrusion to be fit in a "mortise" provided in a separate member, so as to link two members to each other. The narrowed base of the tenon as described above does not cause the two linked members to be readily separated from each other even under application of force of parting the two members from each other. The dovetail joint is generally employed for wood, but is not limited to wood in this application.

In the method using the mold-forming technique as described in (F), forming a layer having a tenon at the first step and subsequently forming a layer having a mortise using the previously formed layer as part of the mold does not need a step of removing the mold from the mortise. This results in producing the protective member relatively easily.

The tenon may be provided in the first layer (inner layer) or in the second layer (outer layer). It is, however, preferable that the second layer is formed to wrap the first layer, in order to protect the first layer from high temperature. In the arrangement that the first layer is wrapped by the second layer, the first layer may be formed in such a shape that the entire first layer serves as a tenon. This simplifies both the shape of the first layer and the shape of the second layer and thereby facilitates mold forming. This enables the two layers to be bonded to each other by the simple technique as described above. This bonding continues its effect even when the second layer is foamed.

(I) In the production method of the above aspect, the first layer and the second layer may include polyurethane. This aspect readily increases the bonding strength between the two layers. This is because forming the two layers by polymerization of the same type of polymer compound causes the first layer and the second layer to be chemically bonded to each other.

(J) In the production method of the above aspect, the thermally foamable material is expanded graphite.

DESCRIPTION OF EMBODIMENTS

Figure 1:
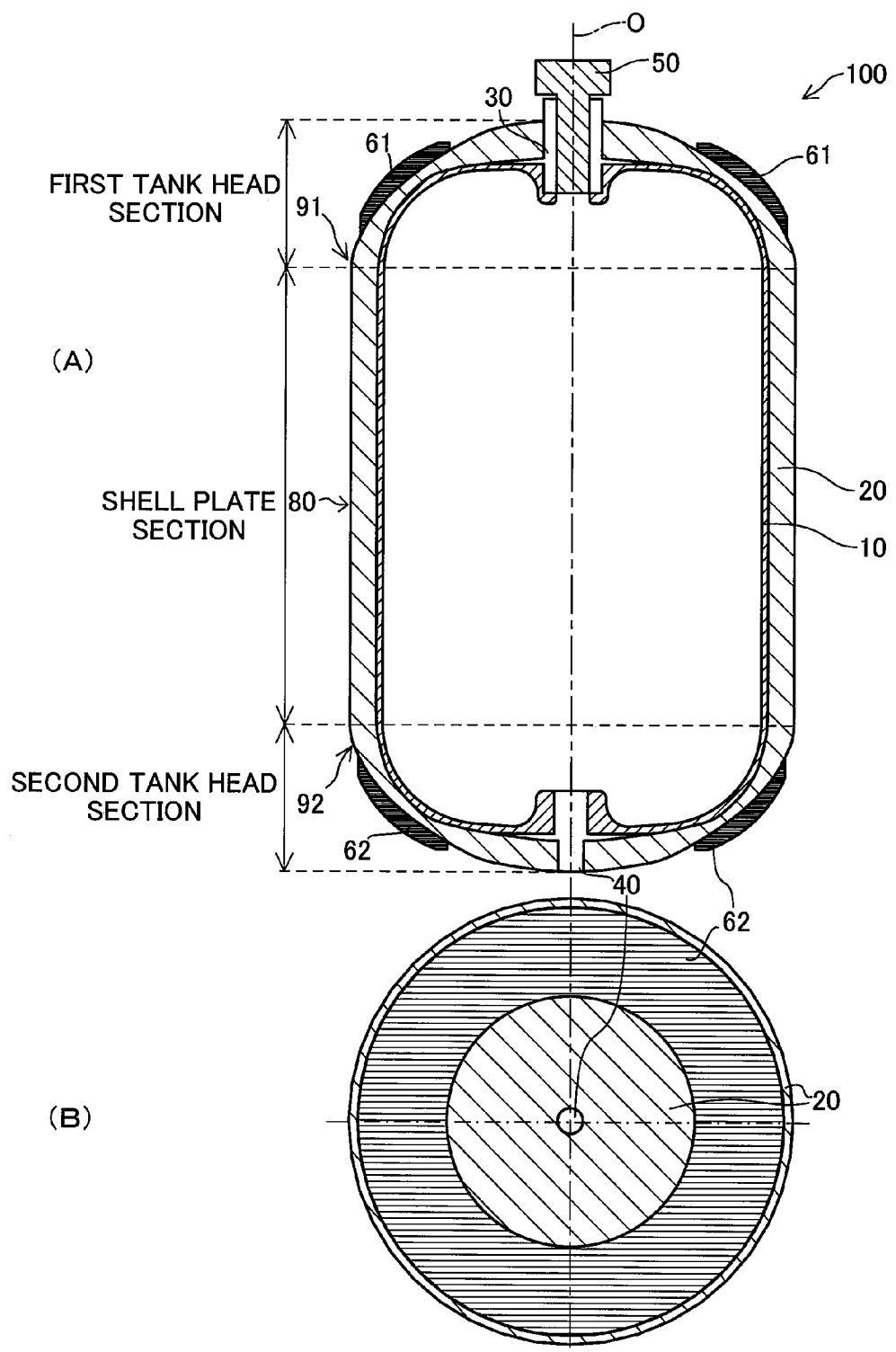
FIG. 1 is a cross sectional view and a bottom view of a high-pressure hydrogen tank.

FIG. 1 illustrates a high-pressure hydrogen tank 100. FIG. 1A is a front cross sectional view, and FIG. 1B is a bottom vies. The high-pressure hydrogen tank 100 is used to supply hydrogen to a fuel cell for automobile and is mounted on the automobile. The high-pressure hydrogen tank 100 includes a resin liner 10, a reinforcing layer 20, a valve-side cap 30, an end-side cap 40, a valve 50, a first protective member 61 and a second protective member 62.

The resin liner 10 is provided to define a space which is to be filled with hydrogen and is produced by resin molding. The reinforcing layer 20 is provided to cover the outer periphery of the resin liner 10, in order to reinforce the resin liner 10. The material of the reinforcing layer 20 is CFRP (carbon fiber reinforced plastic). The reinforcing layer 20 is formed by FW (filament winding) method. The resin liner 10 and the reinforcing layer 20 constitute a tank main body.

As shown in FIG. 1, the tank main body has a shell plate section 80, a first tank head section 91 and a second tank head section 92. The shell plate section 80 forms part of the resin liner 10 and the reinforcing layer 20 and has a cross sectional shape of straight line. The direction of this straight line is identical with the direction of an axis O shown in FIG. 1. The first tank head section 91 and the second tank head section 92 respectively form residual parts of the resin liner 10 and the reinforcing layer 20 other than the part formed by the shell plate section 80. In other words, the first tank head section 91 and the second tank head section 92 respectively have cross sectional shapes other than the straight line along the longitudinal direction of the tank or more specifically cross sectional shapes of curved lines.

The valve-side cap 30 is in an approximately cylindrical shape and has a brim extruded from its outer circumferential surface. The valve-side cap 30 is fixed by inserting this brim between the resin liner 10 and the reinforcing layer 20 in the first tank head section 91. The inner circumferential surface of the valve-side cap 30 serves as an inlet/outlet of hydrogen. The valve 50 is operated to open and close the inlet/outlet of hydrogen defined by the valve-side cap 30. The valve 50 includes a fusible plug valve (not shown). The fusible plug valve is one type of safety valve and works to release the pressure of the stored gas to the outside when the temperature of the high-pressure hydrogen tank 100 rises to or above a specified temperature. An external thread is formed on the inner circumferential surface of the valve-side cap 30, whereas an internal thread is formed on the outer circumferential surface of the valve 50. Fastening these threads seals the inside of the resin liner 10.

The end-side cap 40 is placed in the second tank head section 92 to be exposed on both the inside and the outside of the tank. This placement is for the purpose of releasing the heat inside of the tank to the outside. In order to enhance the efficiency of heat release, a metal such as aluminum is employed for the material of the end-side cap 40.

The first protective member 61 is provided to cover a thin-wall portion and its periphery (hereinafter collectively referred to as "thin-wall region") of the first tank head section 91, so as to protect the thin-wall portion from impact. The thin-wall portion of the first tank head section 91 is a region of the first tank head section 91 in which the reinforcing layer 20 has the smallest wall thickness, and forms a middle portion of the first tank head section 91. The middle portion herein is a part away from both the valve-side cap 30 and the shell plate section 80. The appearance of this thin-wall portion is attributed to that the reinforcing layer 20 is formed by the FW method. The thin-wall portion has lower resistances to impact and high temperature, compared with the other portions.

The first protective member 61 is formed in a shape of truncated conical surface (hereinafter this shaped is called "flat marker cone shape") to cover the thin-wall portion. Polyurethane foam is employed for the material of the first protective member 61, in order to enhance the impact resistance. The first protective member 61 is formed by mold forming and is fixed to the outer surface of the reinforcing layer 20 by means of an adhesive.

The second protective member 62 is placed to cover a thin-wall region of the second tank head section 92, so as to protect the thin-wall portion from impact and high temperature. The second protective member 62 has an outer shape approximately the same as the outer shape of the first protective member 61. The second protective member 62 is fixed to the reinforcing layer 20 by means of an adhesive. Unlike the first protective member 61, the second protective member 62 has a double layer inner structure. This inner structure is provided to achieve the protective function from both the impact and the high temperature. The second protective member 62 is produced by mold forming. This double layer structure is described with reference to FIGS. 2 and 3.

Figure 2:
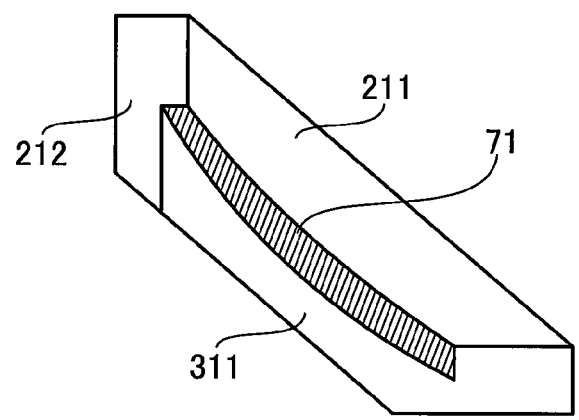
FIG. 2 is a diagram illustrating a first step in a production process of a second protective member.
Figure 3:
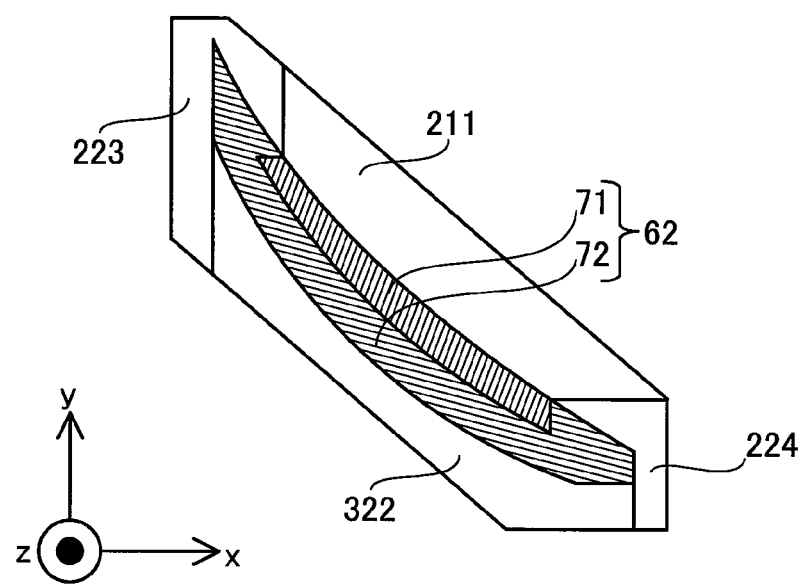
FIG. 3 is a diagram illustrating a second step in the production process of the second protective member.

FIGS. 2 and 3 illustrate a left half of end faces of a mold and the second protective member 62, in order to explain a production process of the second protective member 62. These end faces are bilaterally symmetrical, so that a right half of the end faces is omitted from the illustration. The actual shapes of the mold and the second protective member 62 are obtained by rotating the shapes illustrated in FIGS. 2 and 3 about the axis O.

The double layer structure of the second protective member 62 described above has an inner layer 71 and an outer layer 72. FIG. 2 shows a first step of producing the inner layer 71 by mold forming. As shown in FIG. 2, the first step uses a first upper mold 211, a second upper mold 212 and a first lower mold 311. The material of the inner layer 71 is polyurethane foam which is the same material as that of the first protective member 61. Foaming by mixing two liquids using the above molds forms the inner layer 71.

FIG. 3 shows a second step of mold forming the outer layer 72. As shown in FIG. 3, the second step uses the first upper mold 211, a third upper mold 223, a fourth upper mold 224 and a second lower mold 322. The molds used at the second step are provided by replacing the molds other than the first upper mold 211 after the first step. The material of the outer layer 72 is a mixture of expanded graphite and polyurethane foam. Foaming a mixture of expanded graphite with a fluid as the raw material of polyurethane foam using the above molds forms the outer layer 72. The inner layer 71 and the outer layer 72 both contain polyurethane and accordingly have a chemical linkage. The molds illustrated in FIGS. 2 and 3 are only an example of the vertically split type and are not restrictive.

The second protective member 62 is provided to protect the thin wall portion of the second tank head section 92 from impact and high temperature as described above. The inner layer 71 and the outer layer 72 exert the function of protection from impact, whereas the outer layer 72 exerts the function of protection from high temperature. The outer layer 72 contains expanded graphite and is thus abruptly expanded by its thermal foamability when being exposed to high temperature. As a result, the outer layer 72 separates the thin wall portion from, for example, flame as the source of high temperature and exerts the heat insulating function. This function makes the thin wall portion unlikely to have high temperature and results in improving the heat insulating performance of the high-pressure hydrogen tank 100.

The second protective member 62 is provided to protect the thin wall region, while only slightly increasing the body (mass and volume) of the high-pressure hydrogen tank 100. The second protective member 62 has an outer diameter that is smaller than the outer diameter of the shell plate section 80 as illustrated in FIG. 1 and accordingly does not increase the outer diameter of the high-pressure hydrogen tank 100.

Additionally, the second protective member 62 is configured not to significantly slow down the filling rate of the high-pressure hydrogen tank 100. Hydrogen is compressed to have high temperature during the filling operation. It is undesirable that hydrogen has significantly high temperature, so that it is preferable to fill hydrogen while avoiding the temperature of or above a specified temperature. The slow heat release from the inside to the outside of the high-pressure hydrogen tank 100 provides the necessity to slow down the filling rate. The second protective member 62 covers only the thin wall region and does not decrease its heat release property, compared with the configuration that a protective member cover the entire shell plate section 80. As a result, the second protective member 62 does not significantly slow down the filling rate.

As described above, the second protective member 62 hardly increases the body of the high-pressure hydrogen tank 100 and does not significantly slow down the filling rate, while ensuring the advantageous effect of improving the heat insulating performance. These properties are achieved by noting the characteristic of the FW method that the center regions of the first tank head section 91 and the second tank head section 92 form thin wall portions and protecting the thin wall portions by the first protective member 61 and the second protective member 62 provided as separate members.

The first protective member 61 is fixed to the first tank head section 91 as described above. The valve 50 having the fusible plug valve is placed on the first tank head section 91. The first protective member 61 does not contain expanded graphite and is thus hardly expanded when being exposed to high temperature. As a result, the first protective member 61 does not interfere with the function of the fusible plug valve by expansion in the state that the fusible plug valve is to be activated.

The double layer structure of the second protective member 62 has a high bonding strength between the two layers. It is thus unlikely that the outer layer 72 is removed and the second protective member 62 loses the function of protection from high temperature. This advantageous effect is of great significance especially during expansion of the outer layer 72. This bonding strength includes chemical bonding strength and mechanical bonding strength. The chemical bonding strength is generated by inclusion of polyurethane in the inner layer 71 and the outer layer 72.

As shown in FIG. 3, the mechanical bonding strength is generated by serving the entire inner layer 71 as a tenon of a dovetail joint and the recess of the outer layer 72 as a mortise. This function is achieved by the shape of the inner layer 71 and the shape of the recess of the outer layer 72 as illustrated in FIG. 3. The shape of the inner layer 71 herein denotes a shape having a more extended side forming the inner side of the second protective member 62 compared with a side exposed as the outer surface of the second protective member 62. The shape of the recess herein denotes a shape causing the inner layer 71 to be closely fit in the recess. The recess in the shape which the inner layer 71 is closely fit is naturally provided by mold-forming the outer layer 72 using the inner layer 71 as part of the mold.

As understood from FIG. 3, application of a force in a direction parallel to an xy plane to the inner layer 71 and the outer layer 72 does not readily part the inner layer 71 from the outer layer 72. Application of a force in a z direction does not work to separate the inner layer 71 from the outer layer 72 since the inner layer 71 and the outer layer 72 are formed in the flat marker cone shape as described above.

The procedure needed to generate such a mechanical bonding strength simply mold-forms the inner layer 71 and subsequently mold-forms the outer layer 72 by utilizing the inner layer 71 as part of the mold.

Additionally, the outer layer 72 has the recess serving as the mortise while wrapping large part of the inner layer 71 and can thus effectively protect the inner layer 71 from high temperature. The large part of the inner layer 71 herein is part that is not in contact with the reinforcing layer 20. Polyurethane is flammable without flame retardant treatment, so that protection of the inner layer 71 from high temperature is effective.

The first protective member 61 and the second protective member 62 are fixed by means of the adhesive. This allows for easy replacement and ensures the easy maintenance.

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

The fluid to be stored is not limited to hydrogen. Expanded graphite may be contained in the inner layer of the second protective member, while expanded graphite may not be contained in the outer layer. The second protective member may have a single layer structure, and expanded graphite may be contained in its single layer.

REFERENCE SIGNS LIST

10 Resin liner
20 Reinforcing layer
30 Valve-side cap
40 End-side cap
50 Valve
61 First protective member
62 Second protective member
71 Inner layer
72 Outer layer
80 Shell plate section
91 First tank head section
92 Second tank head section
100 High-pressure hydrogen tank
211 First upper mold
212 Second upper mold
223 Third upper mold
224 Fourth upper mold
311 First lower mold
322 Second lower mold

The invention claimed is:

1. A pressure vessel, comprising:
a vessel main body having a tank head section and a shell plate section; and
a protective member including a non-foamed thermally foamable material, which forms a heat insulating layer when being foamed, and placed to be brought into contact with and fixed to only an outer surface of the tank head section.

2. The pressure vessel according to claim 1,
wherein the protective member includes a layer containing the thermally foamable material and a layer containing a buffer material.

3. The pressure vessel according to claim 2,
wherein the layer containing the buffer material is placed on an inner side of the layer containing the thermally foamable material.

4. The pressure vessel according to claim 1,
wherein the tank head section includes a first tank head section and a second tank head section, wherein
a safety valve operative to work at high temperature is provided on the first tank head section, and
the protective member is fixed to the second tank head section.

5. The pressure vessel according to claim 1,
wherein the protective member has an outer diameter that is equal to or smaller than an outer diameter of the vessel main body.

6. The pressure vessel according to claim 1,
wherein the part of the tank head section brought into contact with and fixed by the protective member includes a region having a smallest wall thickness.

7. A production method of a pressure vessel, comprising;
producing a vessel main body including a tank head section and a shell plate section; and
bringing a protective member including a non-foamed thermally foamable material, which forms a heat insulating layer when being foamed, into contact with only an outer surface of the tank head section to be fixed to only the outer surface of the tank head section.

* * * * *